(12) United States Patent
Noda et al.

(10) Patent No.: US 6,699,963 B2
(45) Date of Patent: Mar. 2, 2004

(54) GRINDING PROCESS FOR PLASTIC MATERIAL AND COMPOSITIONS THEREFROM

(75) Inventors: Isao Noda, Fairfield, OH (US); William Maxwell Allen, Jr., Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/100,662

(22) Filed: Mar. 18, 2002

(65) Prior Publication Data

US 2003/0176633 A1 Sep. 18, 2003

(51) Int. Cl.$^7$ .................................................. C08F 6/00
(52) U.S. Cl. ......................... 528/481; 241/21; 241/22; 241/24; 241/65; 528/480; 528/503
(58) Field of Search .............................. 241/21, 24, 22, 241/65; 528/480, 481, 503

(56) References Cited

U.S. PATENT DOCUMENTS

| | | |
|---|---|---|
| 3,642,686 A | 2/1972 | Zwahlen et al. |
| 3,745,722 A | 7/1973 | Balz |
| 4,271,639 A | 6/1981 | Talalay et al. |
| 4,547,359 A | 10/1985 | Zierenberg et al. |
| 4,933,182 A | 6/1990 | Higashi et al. |
| 5,257,742 A | 11/1993 | Yashima et al. |
| 5,520,888 A | 5/1996 | Berndt |
| 5,656,299 A | 8/1997 | Kino et al. |
| 5,662,279 A | 9/1997 | Czekai et al. |
| 5,714,445 A | 2/1998 | Trinh et al. |
| 5,718,388 A | 2/1998 | Czekai et al. |
| 5,718,919 A | 2/1998 | Ruddy et al. |
| 5,798,440 A | 8/1998 | Liddell et al. |
| 5,834,582 A | 11/1998 | Sinclair et al. |
| 5,880,220 A | 3/1999 | Warzelhan et al. |
| 5,902,861 A | 5/1999 | Megill |
| 6,228,934 B1 | 5/2001 | Horowitz et al. |
| 6,323,276 B2 | 11/2001 | Horowitz et al. |

FOREIGN PATENT DOCUMENTS

| | | |
|---|---|---|
| EP | 0068684 A1 | 1/1983 |
| EP | 0 428 427 B1 | 5/1991 |
| GB | 1588777 | 4/1981 |
| JP | 53-16426 | 6/1978 |
| JP | 7-185375 | 7/1995 |

OTHER PUBLICATIONS

"A Renaissance on Milling Technology", Pharmaceutical Manufacturing Review, pp. 33–34, (Sep. 1993). D M G World Media.

Wichert, et al., "A New Method for the Preparation of Drug Containing Polylactic Acid Microparticles without Using Organic Solvents", Journal of Controlled Release, vol. 14, pp. 269–283, (1990), Elsevier Science Publishers B.V.

Kohler, "Cryogenic Processing of Scrap Tyres", Polymer Recycling, vol. 2, No. 2, pp. 83–88, (1996), Rapra Technology Ltd.

Ritter, "Keep Cool with Cryogenic Grinding", Chemical Engineering, vol. 104, No. 4, pp. 88–92, (1997), Chemical Week Associates.

Patel, et al., "Pressure Shear Pulverization (PSP) Process for Thermoplastic and Thermoset Waste", Annu. Tech. Conf.— Soc. Plast. Eng. 57th, vol. 3, pp. 3251–3254, (1999), Center for Manufacturing Research and Technology Utilization, Tennessee Technological University.

*Primary Examiner*—Terressa Boykin
(74) *Attorney, Agent, or Firm*—Bart S. Hersko

(57) ABSTRACT

The present invention relates to a process for grinding a plastic material to produce superfine particles and compositions, such as suspensions and dry powders, resulting from such process. Common ice is the abrasive for grinding.

22 Claims, No Drawings

GRINDING PROCESS FOR PLASTIC MATERIAL AND COMPOSITIONS THEREFROM

FIELD OF THE INVENTION

The present invention relates to a process for grinding a plastic material to produce superfine particles and compositions, such as suspensions and dry powders, resulting from such process. Common ice is the abrasive for grinding.

BACKGROUND OF THE INVENTION

Plastics are commonly used for a seemingly unlimited number of modern products. For certain uses, plastics must be finely ground. A common way to grind plastics is to mix them with powdered dry ice and pass the mixture through a milling apparatus with a fine grating on the bottom that allows particles small enough to pass through. Though this process works, it is very tedious and takes a long time to even get a small amount of product. Cleaning the mill is also laborious, not to mention the safety hazard of milling fine materials in the air.

Milling media commonly include sand, spheres of silica, stainless steel, silicon carbide, glass, zirconium, zirconium oxide, alumina, titanium, polymeric media, or inorganic salts such as sodium chloride, for example. U.S. Pat. No. 3,642,686 relates to pigment preparations made by using an inorganic salt as a grinding agent. In one example, a kneaded composition is decomposed by adding 50 parts ice and isopropanol, and is granulated by further kneading, followed by wet grinding with about 3000 parts water in a mill to form a very fine granulate. U.S. Pat. No. 3,745,722 relates to the finishing of workpieces using abrasive grains in an ice matrix. GB 1 588 777 relates to solid pigment formulations that may be manufactured in a kneader, and wherein sodium chloride is optionally used as a grinding auxiliary. Kneading compositions may be broken up by adding saturated sodium chloride and ice for grinding. EP 0068684 relates to a process for preparing a particulate gel where a swollen gel is subjected to shear stress to produce particles. Parameters varied included ratio of polymer:ice:water, time of liquidizing, blade speeds, and "scale-up," however, the particles obtained from these conditions are large (e.g., >500 microns). In order to obtain a fraction of particles smaller than 200 microns, use of mesh was required. U.S. Pat. No. 5,520,888 relates to treating biomedical waste with ozone containing ice where entrapped ozone is released upon melting of the ice. Particles of about ½ to ¼ inch are obtained.

Obtaining finely ground particles in the range of or below 100 microns is technically difficult, since plastic particles can be elastic and will distort rather than fracture during grinding. Also, certain plastics are difficult to grind because they fuse rather than breaking up into fine particles. For example, attempts at producing an artificial latex of a polyhydroxyalkanoate (PHA) copolymer termed NODAX™, The Procter & Gamble Company, have included emulsifying a solution in an organic solvent and then stripping off the solvent to leave solid particles suspended in water. These process conditions are difficult to control and often inefficient, leaving a lot of wasteful coagulum. The requirement for a large amount of surfactants needed for emulsifying a NODAX™ solution is also a concern. Direct cryogenic dry grinding of NODAX™ resin using dry ice as a coolant requires no lingering additives like surfactants. Unfortunately, this method had limited success in creating a fine powder of NODAX™. The particle size could not be well controlled, and amalgamation of particles to form gritty aggregates became a problem.

Individual PHA granules found in biological cells as inclusion bodies such as those described in U.S. Pat. No. 5,849,854 to Noda are up to 1 micron in size or even smaller. Biological cells containing PHA or a mixture of biomass and PHA granules can aggregate to be about 40 microns in size, however, the individual PHA granules inside of this aggregate are still 1 micron or less. The 40 micron aggregates are not pure PHA granules; they contain well over 20% to as high as 80% biomass.

The present invention addresses problems in the art of methods for grinding plastics and provides improvements herein. A method that is inexpensive, simple to operate, fast, energy efficient, and that requires no major equipment is provided herein.

SUMMARY OF THE INVENTION

The present invention provides a process for producing particles of a plastic material having a glass transition temperature of between −20° C. to 120° C. The process comprises grinding the plastic material in the presence of an abrasive consisting essentially of ice at a temperature of melting ice, the grinding for a time sufficient to produce a suspension of particles having an average diameter of 10 microns to 200 microns, or less than 100 microns, or about 10 to 40 microns for certain plastics. During the grinding process, the ice melts to form a slurry.

Resulting suspensions in water or dried particles therefrom in the form of a powder are useful for a variety of applications such as, for example, artificial latex, coatings such as for paper, binders, additives for paints, adhesives, drug tablets, fertilizer pellets, a carrier for drugs or dyes or volatile actives such as perfumes, repulping-friendly xerographic toners, as well as cosmetic, laundry, or food applications.

The grinding method of the present invention uses inexpensive and readily available common ice as the abrasive. The method is simple to operate, fast, energy efficient, and requires no major equipment. The grinding method of the present invention is essentially free from typical contaminants found in artificial latex, such as surfactants or residual solvents, since the present process does not require organic solvents to dissolve the polymer as practiced in a conventional artificial latex production. Neither does the grinding method strictly require use of expensive and hazardous gas-evolving cryogens like dry ice or liquid nitrogen. Since the process does not create airborne dust during grinding, the process is free from explosion hazard and is readily contained. Since the grinding medium is regular ice, contamination of the product by chipped or crushed grinding media common to media mills is not present.

PHA powders having an average particle diameter of 10 microns to 100 microns and having greater than 80% purity are further embodiments of the present invention. PLA powders having an average particle diameter of 25 microns to 100 microns are further embodiments of the present invention.

DETAILED DESCRIPTION OF THE INVENTION

The grinding process of the present invention is surprisingly simple, requiring no special equipment other than a conventional grinding tool such as a mechanical blender to grind a plastic material and ice. The process produces unexpectedly fine particles of plastics having an average particle size well below 200 microns, and well below 100 microns for certain plastics, in a form of a slurry or a suspension resembling artificial latex. The resultant slurry can be readily dried to form fine solid powder without extensive agglomeration. The shape of resultant particles is distinctly irregular because they are made by grinding or pulverizing.

A plastic material that is hard and brittle at 0° C. under high shear may be ground by the process of the present invention. More particularly, "hard and brittle at 0° C. under high shear," as used herein, means a plastic material having a glass transition temperature of between −20° C. and 120° C. The value of the glass transition temperature is generally determined by either DSC (Differential Scanning Calorimetry) using, for example, the method outlined in ASTM D 3418, or by DMA (Dynamic Mechanical Analysis) using, for example, the method outlined in ASTM E 1640. Plastic materials having a glass transition temperature between −20° C. and 120° C. include biodegradable polymers such as polyhydroxyalkanoate polymers or copolymers (typical Tg~0° C. to ~20° C.), polylactic acid polymers or copolymers (Tg~60° C.) such as poly(lactides), poly(glycolide) copolymers of lactides and glycolide, or cellulose ethers or esters such as cellulose acetate (Tg~80° C. to 120° C.) as well as non-biodegradable plastics such as polystyrene polymer or copolymer (Tg~100° C.), or polyacrylates such as poly(methyl methacrylate) polymers or copolymers (Tg~100° C.). Embodiments of plastic materials having a glass transition temperature between −20° C. and 120° C. include crosslinked polystyrenes, such as polystyrene crosslinked with divinylbenzene, vinyl chloride polymers and copolymers, polyurethanes, polyamides, polypropylenes, polyhydroxymethacrylate, polyhydroxyethyl acrylate, silicone containing polymers such as polysiloxanes, polyanhydrides, poly(hydroxyethyl methacrylate), poly(imino carbonates), poly(N-acylhydroxyproline)esters, poly(N-palmitoyl hydroxyproline) esters, ethylene-vinyl acetate copolymers, poly(orthoesters), or poly(caprolactones), for example. Mixtures of different polymers may be simultaneously ground by this process.

"Polyhydroxyalkanoate" and "PHA" mean a polymer having the following repeating unit (I):

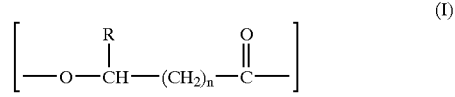

wherein R is H, alkyl or alkenyl, and n is 1 to 4. The terms polyhydroxyalkanoate and PHA include polymers containing one or more different repeating units. "Alkyl" means a carbon-containing chain which may be straight, branched or cyclic, preferably straight; substituted (mono- or poly-) or unsubstituted; and saturated. "Alkenyl" means a carbon-containing chain which may be straight, branched or cyclic, preferably straight; substituted (mono- or poly-) or unsubstituted; and monounsaturated (i.e., one double or triple bond in the chain), or polyunsaturated (i.e., two or more double bonds in the chain, two or more triple bonds in the chain, or one or more double and one or more triple bonds in the chain). In one embodiment, R is H, or C1 or C2 alkyl. In another embodiment, R is a methyl group (CH$_3$). In a further embodiment, R is methyl and n is 1, whereby the polyhydroxyalkanoate polymer comprises 3-hydroxybutyrate units. Representative PHAs include poly-3-hydroxybutyrate (PHB), poly-3-hydroxybutyrate-co-3-hydroxyvalerate (PHBV), poly-3-hydroxybutyrate-co-4-hydroxybutyrate-poly-3-hydroxypropionate, poly-3-hydroxybutyrate-co-3-hydroxypropionate, poly-4-hydroxybutyrate, poly-3-hydroxybutyrate-co-3-hydroxyhexanoate, poly-3-hydroxybutyrate-co-3-hydroxyoctanoate, poly-3-hydroxybutyrate-co-3-hydroxydecanate, poly-5-hydroxyvalerate, and poly-6-hydroxyhexanoate.

Polyhydroxyalkanoate copolymers can be synthesized by chemical or biological methods as disclosed, for example, in U.S. Pat. Nos. 5,618,855, 5,942,597, 5,990,271, RE 36,548, or 6,160,199, each of which is incorporated herein by reference. An example of a polyhydroxyalkanoate copolymer is NODAX® copolymer.

Lactic acid polymers or lactide polymers suitable for grinding herein include, but are not limited to, those polylactic acid-based polymers or polylactide-based polymers that are generally referred to in the industry as "PLA". Examples of polylactic acid polymers include a variety of polylactic acids that are available from the Chronopol Inc. (Golden, Colo.), or polylactides having the tradename EcoPLA®, or NATUREWORKS from Cargill Dow, LACEA from Mitsui Chemical, or a PLA resin L5000 from Biomer.

Cellulose esters are produced by the chemical modification of cellulose and include the family of cellulose acetates, cellulose acetate propionates, and cellulose acetate butyrates. Such materials are obtained from Eastman Chemical Products, Inc. under the tradename TENITE®.

The abrasive used for grinding is ice. As used herein, "ice" means the solid crystal of water. As the ice melts in the grinding process, water is produced to form a slurry. Water may be added at the beginning of grinding, however, added water at the beginning is not necessary since ice will automatically generate water due to the mechanical energy converted to heat during the grinding process. The role of added water or water resulting from melted ice is to keep the ground plastic particles apart by suspending them. The product thus is the slurry or suspension.

Many different grinding or milling devices, such as a mechanical blender, a bead or ball mill, hammer mill, roller mill, or the like, can be utilized for efficient grinding or pulverizing. While the grinding is described in the examples herein as batch processes, a continuous grinding mode may be used. The plastic material to be ground and ice may be may be continuously introduced during grinding and the resultant ground suspension continuously removed. Additional process steps may include sieving, filtering, or centrifugal or sedimentational separations to fractionate particles having a certain particle size distribution, for example. Larger particles may be recycled and reground if desired.

Suspensions of particles of the present invention can comprise other components typically present for a particular use of the suspension. These components include water, surfactants, emulsifiers, skin care agents, humectants, antioxidants, viscosity modifiers, suspending agents, pH buffering systems, disinfectants, antibacterial actives, antifungal actives, antiviral agents, vitamins, pharmaceutical actives, film formers, perfumes, soothing agents, pigments, deodorants, opacifiers, astringents, solvents, preservatives, or the like. These materials are known in the art as additives and can be employed in appropriate amounts in the compositions for use herein. Suitable preservatives include propyl paraben, methyl paraben, benzyl alcohol, benzalkonium, tribasic calcium phosphate, BHT, or acids such as citric, tartaric, maleic, lactic, malic, benzoic, salicylic, and the like. Stabilizers provide improved shelf and stress stability. Preservatives or stabilizers may be added to the slurry to prevent degradation or settling, respectively.

Grinding time is adjusted according to the need for the size distribution of pulverized particles. Scanning electron microscopic data on samples obtained over different time intervals indicate that reduction in particle size largely occurs in the first few minutes of grinding. The grinding speed is also an adjustable variable for the target particle size, the milling device to be used, and the composition of the plastic and ice mixture. Although an optimal ratio for the plastics, ice and water occurs after ice has melted or water is added to provide a ratio of 1:1:4, different ratios of mixtures can be used as needed. For example, additional ice can be supplied during the grinding process to compensate the melting.

The grinding temperature is a temperature of melting ice, normally at about 0° C., however, the temperature of melting ice is meant herein to include those temperatures of melting ice as adjusted by addition to the ice-plastics mixture melting point depressing agents such as salts (NaCl, or $CaCl_2$, for example), or organic solvents such as ethanol or isopropanol, or by external cooling systems, or by use of an additional cryogen, such as dry ice, or liquid nitrogen, for example. Such agents may be used according to the need of the polymer to be ground, for example a polymer having a glass transition temperature lower than 0° C. Above this temperature range, a plastic may become too ductile and tough to be pulverized. At a melting temperature of ice, the plastic remains brittle and susceptible to fracture.

Particles of plastic materials are optimally produced by grinding flakes of the plastic polymer with a simple mechanical device such as a blender in the presence of chunks of crushed ice. After subjecting the mixture of polymer and ice to the shearing action of a blender, a latex-like suspension of finely ground polymer particles is obtained. Furthermore, the suspension can be dried to produce very fine solid powder. While not wanting to be bound by theory, the present inventors believe that several factors contribute to the surprisingly small particle size produced by the method. Ice crystals having sharp edges likely act as an effective grinding media capable of efficiently transferring mechanical energy supplied by the blender to individual polymer flakes to pulverize them. The temperature of melting ice is sufficiently close to or lower than the glass transition temperature of the polymer, such that the flakes become brittle and easily fragmented. Finally, water resulting from melting ice or added water surrounding the pulverized polymer effectively prevents the agglomeration and fusion of particles.

Instead of flakes, the starting polymer materials may have other shapes and forms, such as short fibers, fabricated films, pellets, chunks, or the like. Use of flakes or fragmented thin films are somewhat preferred over pellets or larger chunks since the time for grinding the material to a desired size is shorter for flakes or films than for pellets or chunks.

Ground plastic particles resulting from the method of the present invention are less than 200 microns or less than 100 microns, and can range from 10 to 100 microns, from 30 to 70 microns, or from 10 to 40 microns. Particle size refers to a number average particle size as measured by conventional particle size measuring techniques such as sedimentation field flow fractionation, photon correlation spectroscopy, disk centrifugation, microscopy or sieving.

Individual PHA granules found in biological cells as inclusion bodies such as those described in U.S. Pat. No. 5,849,854 to Noda are up to 1 micron in size or even smaller. PHA particles produced by the grinding process of the present invention are on the average no smaller than 10 microns. Biological cells containing PHA or a mixture of biomass and PHA granules can aggregate to be about 40 microns in size, however the individual PHA granules inside of this aggregate are still 1 micron or less. The 40 micron aggregates are not pure PHA granules; they contain well over 20% to as high as 80% biomass. In contrast, the individual particles resulting from the present grinding method are of a size of 10 microns or larger and comprise at least 80% PHA, more particularly, 90% PHA, and even more particularly, 95% PHA.

Further, the shape of the PHA particles of the present invention is different from the shape of inclusion body granules of PHA found in biological cells. Such granules tend to have a smooth round surface where the surface area of each particle is minimized. Particles of the present invention, made by grinding and fragmentation, have a characteristic shattered "asteroid" look with a relatively high surface area for a given volume. The particles have an irregular shape, and a fractured appearance with sharp edges. For biodegradable plastics, biodegradability is enhanced by such a large surface area since accessibility to enzymes is increased.

The grinding process of the present invention provides very finely ground particles of plastics. Suspensions thereof in water or dried particles thereof in the form of a powder are useful for a variety of applications such as, for example, artificial latex, coatings such as for paper, binders, additives for paints, adhesives, drug tablets, fertilizer pellets, a carrier for drugs or dyes or volatile actives such as perfumes, repulping-friendly xerographic toners, as well as cosmetic, laundry, or food applications. The powder is well suited for molding operations to fabricate various shapes and forms and can be colored to be used as toners. Particles having a size of 1 micron are not usable for toners, for example. Ground particles can also be fused or sintered by heating to produce articles of various shapes and forms without the need of melt extrusion and injection into molds.

For coating applications, a stable aqueous dispersion of plastic powder can be used in a manner similar to synthetic latex paint products. Such coating methods based on dispersions tend to produce uniform covering layers over substrates like paper board. Upon drying and annealing, the particles delivered from the dispersion are fused together (a sintering process) to produce very thin pinhole-free continuous coating layers, often superior to direct lamination of extruded films. For example, coated paper cups and plates as well as various packaging material and containers may be made using this approach. A dry coating is useful for fragile materials such as tissue paper, for example.

Plastic particles or suspensions resulting from the grinding process of the present invention are further useful as coatings, binders, additives for paints, food, adhesives, as carriers for dyes, pigments, bioactives, or perfumes, or for forming a variety of plastic articles, such as films, sheets, foams, fibers, nonwovens, elastomers, adhesive or molded articles. Such plastic articles can be further incorporated into a variety of useful products including personal cleansing wipes or disposable health care products.

A biodegradable dry powder provided by the present invention may be used as a perfume delivery vehicle. The affinity of perfume to certain plastics, in particular, PHA plastics, combined with the right particle size needed to be entrapped within a matrix of fabrics makes ice-ground PHA powder useful as a laundry additive.

Example 1
Grinding of PHA with Ice

A mixture comprising 400 g of water, 100 g ice, and 100 g of flakes of poly(3-hydroxybutyrate-co-3-hydroxyhexanoate) with 12% 3-hydroxyhexanoate content is added to a commercial high-speed blender (Waring 2-L Two-Speed Blender, Waring Products Division, New Hartford, Conn.). The PHA is ground with ice and water at the high speed setting of about 23,000 rpm for 4 minutes. Pieces of PHA attached to the inside wall of the blender is washed down periodically with a small amount of water. Since the grinding process generates heat, more ice is added as needed to keep the temperature of the mixture at 0° C. The suspension is filtered with 200 micron wire mesh to remove any residual coarse particles. A milky white suspension of finely ground PHA in water is obtained. The average particle size of the ground PHA observed under a microscope is about 40 microns. A few milligram of sodium azide is added to the aqueous suspension of the polyhydroxyalkanoate to prevent bacterial contamination.

Example 2
Grinding of PHA with Ice with Suspension Stabilizer

A mixture comprising 400 g of water, 100 g ice, 100 g of flakes of poly(3-hydroxybutyrate-co-3-hydroxyoctanoate) with 8% 3-hydroxyoctanoate content, 4 g of a commercial clay nanoparticle suspension stabilizer (Laponite RDS, Southern Clay Products), and 2 g of sodium chloride is added to a commercial high-speed blender (Waring 2-L Two-Speed Blender, Waring Products Division, New Hartford, Conn.). The PHA is ground with ice and water at the high speed setting of about 23,000 rpm for 5 minutes. Pieces of PHA attached to the inside wall of the blender is washed down periodically with a small amount of water. Since the grinding process generates heat, more ice is added as needed to keep the temperature of the mixture at 0° C. The suspension is filtered with 200 micron wire mesh to remove any residual coarse particles. A milky white suspension of finely ground PHA in water is obtained. The average particle size of the ground PHA observed under a microscope is about 30 microns. The suspension is stable after a week with little sign of particles sedimentation.

Example 3
Production of Fine Dry Powder

A mixture comprising 400 g of water, 100 g ice, and 100 g of flakes of poly(3-hydroxybutyrate-co-3-hydroxyhexanoate) with 5% 3-hydroxyhexanoate content is added to a commercial high-speed blender (Waring 2-L Two-Speed Blender, Waring Products Division, New Hartford, Conn.). The PHA is ground with ice and water at the high speed setting of about 23,000 rpm for 5 minutes. The suspension is filtered with 200 micron wire mesh to remove any residual coarse particles. The average particle size of the ground PHA observed under a microscope is about 30 microns. To obtain a dry powder, the resulting slurry is vacuum filtered using a Buchner funnel and filter flask. The powder obtained is further dried in a vacuum oven to ensure complete removal of residual water. The resulting cake of dry powder is gently crushed to small pieces and sieved using a fine wire mesh to collect particles having the average size of about 150 microns.

Example 4
Production of Dyed Powder

Flakes of poly(3-hydroxybutyrate-co-3-hydroxyhexanoate) with 5% 3-hydroxyhexanoate content is exposed to Sudan Red dye. A mixture comprising 400 g of water, 100 g ice, and 100 g of dyed flakes of poly(3-hydroxybutyrate-co-3-hydroxyhexanoate) is added to a commercial high-speed blender (Waring 2-L Two-Speed Blender, Waring Products Division, New Hartford, Conn.). The PHA is ground with ice and water at the high speed setting of about 23,000 rpm for 10 minutes. More ice is added as needed to keep the temperature of the mixture at 0° C. The suspension is filtered with 200 micron wire mesh to remove any residual coarse particles. The average particle size of the ground PHA observed under a microscope is about 20 microns. To obtain a dry powder, the resulting slurry is vacuum filtered using a Buchner funnel and filter flask. The powder obtained is further dried in a vacuum oven to ensure complete removal of residual water. The resulting cake of dry powder is gently crushed to small pieces and sieved using a fine wire mesh to collect particles having the average size of about 40 microns. The powder is electrostatically deposited onto paper surface and heat fused to create printed image.

Example 5
Grinding of Polylactic Acid Polymer

A mixture comprising water, ice, and flakes of PLA is ground as provided in Example 1. A milky white suspension of finely ground PLA in water is obtained. The average particle size of the ground PHA observed under a microscope is about 100 microns.

Example 6
Grinding of Polystyrene

A mixture comprising water, ice, and flakes of polystyrene is ground as provided in Example 1. A milky white suspension of finely ground polystyrene in water is obtained. The average particle size of the ground PHA observed under a microscope is about 100 microns.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art in light of the present disclosure that various other changes and modifications can be made without departing from the spirit and scope of the invention. It is intended to cover in the appended claims all such changes and modifications that are within the scope of the invention.

What is claimed is:

1. A process for producing particles of a plastic material having a glass transition temperature of between −20° C. to 120° C., the process comprising:

grinding the plastic material in the presence of an abrasive consisting essentially of ice, at a temperature of melting ice, for a time sufficient to produce a suspension of particles having an average diameter of 10 microns to 200 microns, wherein the ice melts to form a slurry of particles of the plastic material, wherein the plastic material comprises a polyhydroxyalkanoate polymer or copolymer.

2. The process of claim 1 wherein the polyhydroxyalkanoate polymer or copolymer is poly-3-hydroxybutyrate-co-3-hydroxyvalerate.

3. The process of claim 1 wherein the polyhydroxyalkanoate polymer or copolymer is poly-3-hydroxybutyrate-co-3-hydroxyhexanoate.

4. The process of claim 1 wherein the polyhydroxyalkanoate polymer or copolymer is poly-3-hydroxybutyrate-co-3-hydroxyoctanoate.

5. The process of claim 1 wherein polyhydroxyalkanoate polymer or copolymer is poly3-hydroxybutyrate-co-3-hydroxydecanate.

6. The process of claim 1 further comprising adding a cryogen during grinding to maintain the temperature of grinding.

7. The process of claim 6 wherein the cryogen is ice.

8. The process of claim 1 wherein an external cooling system is used to maintain the temperature.

9. The process of claim 1 further comprising a step of drying the suspension to form a powder.

10. The process of claim 1 further comprising a step of fractionating the suspension of particles by size.

11. The process of claim 9 further comprising a step of fractionating the powder by size.

12. The process of claim 2 wherein the particles have an average diameter of less than 100 microns.

13. A product made using the process of claim 1.

14. A composition comprising polyhydroxyalkanoate polymer or copolymer particles having an average particle diameter of 10–100 microns and having greater than 80% purity.

15. The composition of claim 14 wherein the average particle diameter is from 10–40 microns.

16. The composition of claim 14 in the form of a slurry.

17. The composition of claim 14 in the form of a powder.

18. The composition of claim 14 in the form of a carrier.

19. The composition of claim 14 in the form of a coating.

20. The composition of claim 14 in the form of a binder.

21. The composition of claim 14 further comprising a dye.

22. The process of claim 1 wherein the polyhydroxyalkanoate polymer or copolymer is poly-3-hydroxybutyrate.

* * * * *

UNITED STATES PATENT AND TRADEMARK OFFICE
CERTIFICATE OF CORRECTION

PATENT NO. : 6,699,963 B2
APPLICATION NO. : 10/100662
DATED : March 2, 2004
INVENTOR(S) : Isao Noda et al.

Page 1 of 1

It is certified that error appears in the above-identified patent and that said Letters Patent is hereby corrected as shown below:

<u>Column 3</u>

Line 24, delete "~20° C." and insert -- -20° C --.

<u>Column 9</u>

On lines 5-6, delete "poly3-hydroxybutyrate-co-3-hydroxydecanate" and insert

-- poly-3-hydroxybutyrate-co-3- hydroxydecanate --.

Signed and Sealed this

Eighth Day of January, 2008

JON W. DUDAS
*Director of the United States Patent and Trademark Office*